INVENTORS.
FRANCOIS F. KIRCHNER
LEROY S. JIMERSON, JR.
BY
THEIR ATTORNEY.

Aug. 15, 1961    F. F. KIRCHNER ET AL    2,996,658
MAGNETIC RESONANCE APPARATUS
Filed Dec. 12, 1955    3 Sheets-Sheet 2

INVENTORS.
FRANCOIS F. KIRCHNER
LEROY S. JIMERSON, JR.
BY
THEIR ATTORNEY.

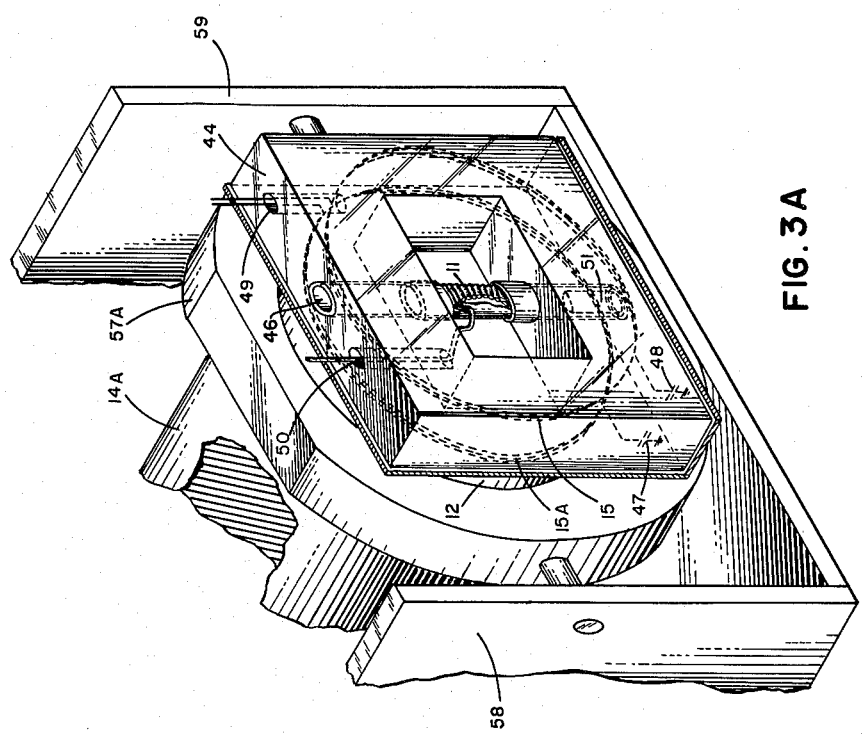
FIG. 3A
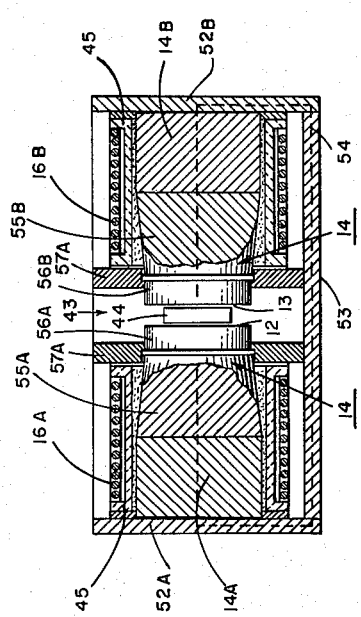
FIG. 3
INVENTORS.
FRANCOIS F. KIRCHNER.
LEROY S. JIMERSON, JR.
BY
THEIR ATTORNEY.

2,996,658
MAGNETIC RESONANCE APPARATUS

Francois F. Kirchner and Leroy S. Jimerson, Jr., Ridgefield, Conn., assignors, by mesne assignments, to Schlumberger Well Surveying Corporation, Houston, Tex., a corporation of Texas
Filed Dec. 12, 1955, Ser. No. 552,403
6 Claims. (Cl. 324—.5)

The present invention relates to magnetic resonance apparatus, and more particularly to new and improved apparatus for obtaining indications of nuclear and other paramagnetic resonance phenomena.

Electron and nuclear paramagnetic resonances have been observed in the past by utilizing magnetic resonance spectrometers which respond to the absorption of energy from an alternating magnetic field by a paramagnetic sample under investigation. In general, the sample is placed in a unidirectional magnetic field, and a coil is disposed in the vicinity of the sample such that an alternating magnetic field is generated within the sample perpendicularly to the unidirectional field when the coil is activated with a high frequency alternating current. The sample is passed through resonance by varying either the frequency of the alternating current which generates the alternating field, or the intensity of the unidirectional field since the resonance precession frequency of the paramagnetic particles in the sample is directly proportional to the intensity of the unidirectional field applied thereto. The resonance is observed as a result of the loading of the coil caused by absorption of energy at the resonance precession frequency.

The present magnetic resonance absorption spectrometers are, in general, extremely delicate instruments in which the high frequency activated detecting coil is included in a manually balanced R.F. bridge or in the tank circuit of an R.F. oscillator. Accordingly, a large amount of time, effort, and skill are required to obtain the measurements for each sample tested. Though a certain degree of success has been obtained under the closely supervised, carefully controlled conditions of research laboratories, these absorption spectrometers are essentially unsuited for industrial application where economical and reliable equipment must be used by relatively unskilled personnel. Where simplification has been attempted, as by providing a relatively uncomplicated circuit for measuring variations in the effective Q of the detecting coil, the resulting low signal-to-noise ratio has made the equipment unreliable.

Accordingly, it is a primary object of the present invention to provide new and improved apparatus for obtaining indications of nuclear and other paramagnetic resonance phenomena which is both accurate and relatively uncomplicated in operation.

A further object of the present invention is to provide new and improved magnetic resonance absorption apparatus which may be made extremely rugged for industrial application and which is fully reliable.

These and other objects of the invention are attained by disposing the alternating field coil perpendicularly to a unidirectional field which is modulated in intensity at a low frequency between predetermined limits. The coil is so arranged that a sample to be tested may be inserted therein or passed therethrough. Additionally, the coil is included electrically in a parallel circuit that is tuned to the frequency of the current to be applied thereto. A constant frequency, constant intensity, essentially noise-free, high frequency oscillator is coupled to the coil circuit through attenuating means and circuit means which matches the coil circuit to the oscillator output. The output of the coil circuit is applied to a high frequency amplifier and thence to a detector for detecting the low frequency variations resulting from the interaction of the resonance and the modulation of the unidirectional field. These variations may be recorded or otherwise utilized to determine the magnetic resonance properties of the sample under investigation.

The invention will be more fully understood with reference to the accompanying drawings, in which:

FIGS. 3 and 3a show two views of the physical arrangement of the coil and unidirectional field generating means.

Figure 1:
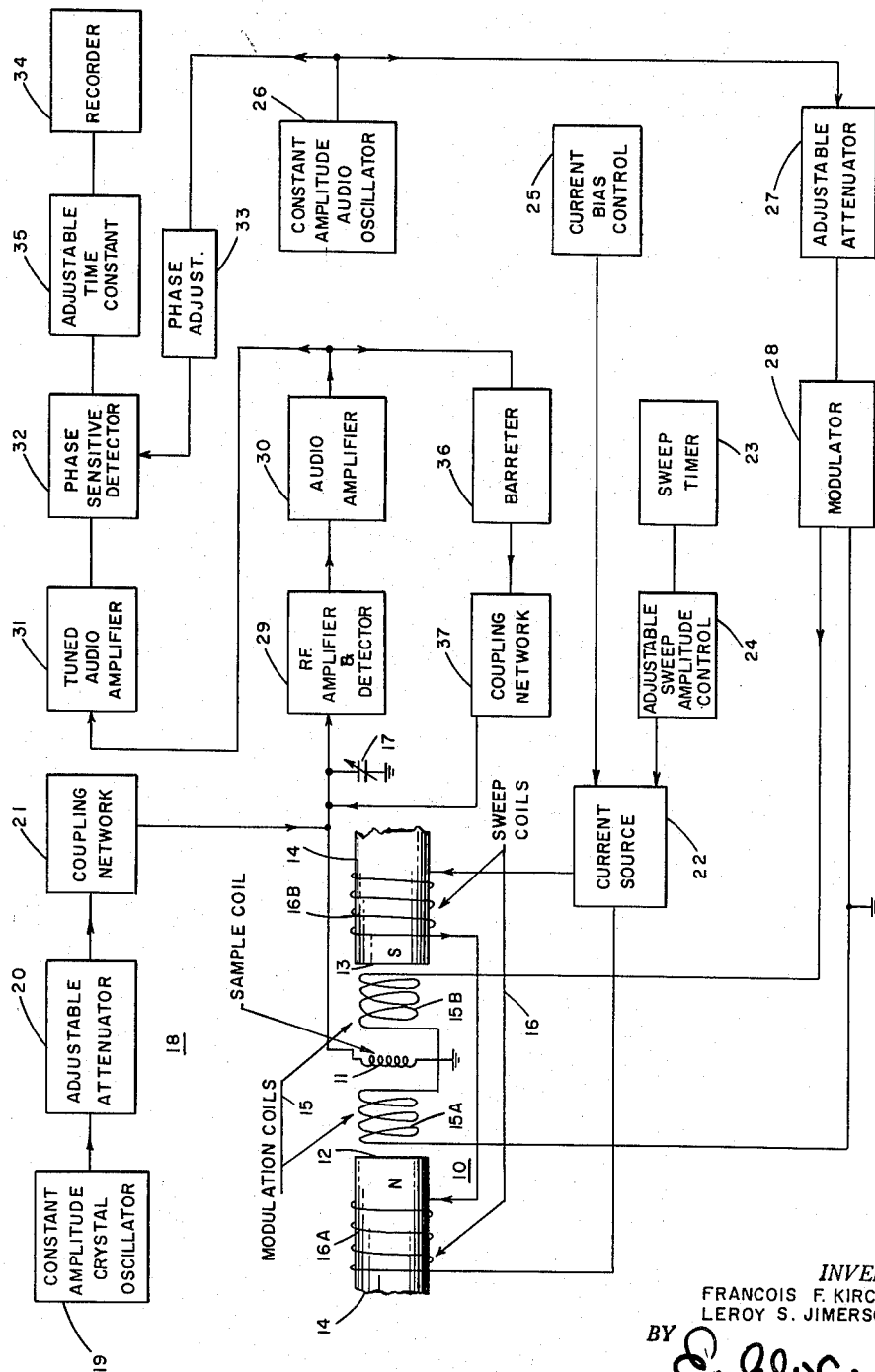
FIG. 1 is a schematic representation of a complete absorption spectrometer constructed in accordance with the present invention.

In FIG. 1, the magnetic resonance absorption spectrometer constructed in accordance with the invention includes a sample testing portion 10, which will be described in greater detail in connection wtih FIGS. 3 and 3a. In general, sample testing portion 10 includes an R.F. coil 11 mounted perpendicularly between the pole faces 12 and 13 of a permanent magnet 14. Coil 11 is adapted to receive interior thereof a sample to be tested. Also included between pole faces 12 and 13 is a modulation coil 15 which is divided into two separate coils 15A and 15B on either side of coil 11 and parallel with the unidirectional field of magnet 14 between pole faces 12 and 13. Wound on magnet 14 is a sweep coil 16 which is also divided into two separate coils 16A and 16B.

Coil 11 is electrically connected in parallel with a tuning capacitor 17. In order that the circuit comprising coil 11 and capacitor 17 may receive substantially noise-free R.F. current of constant intensity and proper frequency, a generating circuit 18 is provided, which will be described in greater detail in connection with FIG. 4. In general, circuit 18 includes a crystal controlled R.F. frequency oscillator 19 having a constant intensity output which is applied to a variable, resistive attenuator 20 and then properly coupled to coil 11 and capacitor 17 by means of a capacitative coupling network 21. Capacitor 17 is adjusted so that the tank circuit including coil 11 and capacitor 17 is tuned to the frequency of oscillator 19.

The unidirectional magnetic field provided by magnet 14 is swept slowly between predetermined limits by varying the D.C. current passed through sweep coil 16. To this end coil 16 is connected to current source 22 which is controlled in time by a sweep timer 23 and in amplitude by a sweep amplitude adjuster 24. In addition, the average intensity of the unidirectional field may be varied by control circuit 25 coupled to current source 22. Current source 22 may comprise a chopper stabilized D.C. amplifier providing a constant D.C. output in response to a particular bias provided by adjustable bias control 25. Control 25 may be adjusted periodically to correct for any intensity drift, usually due to temperature variations, in the unidirectional field supplied by magnet 14. To keep temperature variations to a minimum, magnet 14 is preferably thermally insulated. Sweep timer 23 may consist of a motor driven potentiometer providing a triangularly shaped D.C. signal, the amplitude of which is adjusted by amplitude control 24.

In addition, the unidirectional magnetic field is modulated at a higher rate by low frequency alternating current passing through modulation coil 15. To this end, there is provided a constant amplitude low frequency oscillator 26, the output of which is applied to an adjustable attenuator 27 and thence to a modulator 28 which may comprise a low frequency power amplifier. The output current of modulator 28 is passed through coil 15.

The R.F. voltage across coil 11 and capacitor 17 is applied to a tuned R.F. amplifier and detector 29 and the detected output applied to two stages 30 and 31 of low frequency amplification, stage 30 being broadly tuned while stage 31 is narrowly tuned to the frequency of oscillator 26. The output of amplifier 31 is applied to a phase sensitive detector 32 receiving a sensitizing or reference signal from oscillator 26 via phase adjuster 33. The D.C. output of detector 32 is applied via an appropriate time constant circuit 35 to a recorder or meter 34 which preferably makes a record as a function of time.

In order that the measured signal may be compared with one of known intensity, absorption spectrometers are often provided with means for introducing a calibrating signal into the detecting coil circuit, whereby the gain of the system may be determined after each resonance measurement. In other systems feedback is employed to maintain the average R.F. level at coil 11 constant, thereby making the system essentially independent of variations in gain. However, in the system shown in FIG. 1, the negative feedback arrangement described in copending application Serial No. 552,401, filed December 12, 1955, by Francois F. Kirchner for "Control Systems" is preferably employed. To this end, the low frequency output of amplifier 30, which is 180° out of phase with the modulation on the R.F. signal at coil 11, is used to control the resistance of a so-called "barreter" 36, the resistance of which is a direct function of the current passing therethrough. Barreter 36 is coupled by network 37 in parallel with coil 11 and capacitor 17. Thus, as the detected R.F. signal varies, these variations will be "cancelled" or, more exactly, reduced by the reciprocal of the feedback loop gain by the opposing variations in resistance, e.g., as the R.F. voltage across coil 11 tends to increase, the resistance thereacross will decrease and the voltage will tend to decrease since the current applied from circuit 18 is maintained constant. For a more detailed explanation, reference may be had to the aforementioned copending application.

Figure 2:
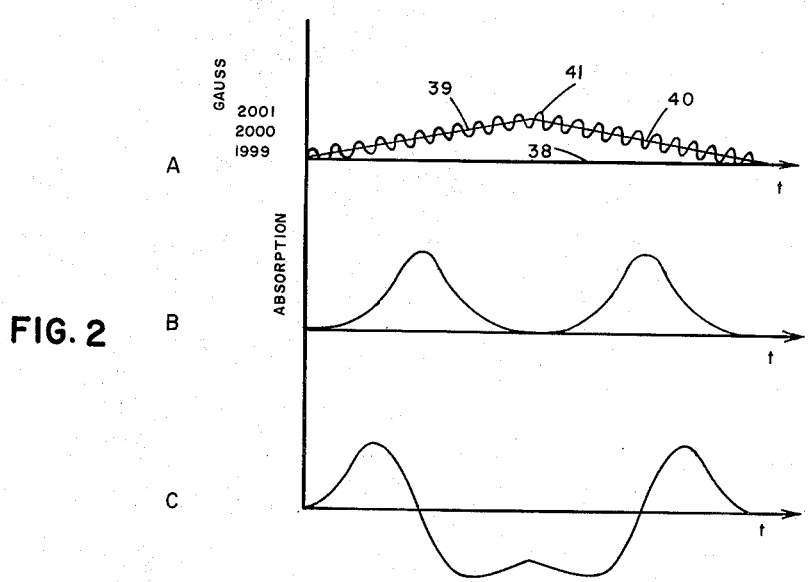
FIG. 2 is a series of current and potential diagrams utilized to explain the operation of the circuit described in connection with FIG. 1.

In operation, assume that in the absence of sweep or modulation magnet 14 applies a unidirectional field of 1999 gauss having a homogeneity within 5 parts per million, to the sample in coil 11, as shown by line 38 in FIG. 2A. The current through sweep coil 16 may increase this field linearly from 1999 to 2001 gauss in one minute, as shown by line 39, while during the next minute the current decreases the field from 2001 gauss back to 1999 gauss, as shown by line 40. In addition, superimposed on sweeps 39 and 40 is a modulation supplied by the current through coil 15, which may be at 30 cycles/ sec. and $10^{-3}$ gauss in amplitude, as shown by curve 41.

The frequency $f$ of oscillator 19 may be selected from the relation $$f = \gamma H_0 / 2\pi$$

where $\gamma$ is the gyromagnetic ratio of the particles under consideration and $H_0$ is the intensity of the unidirectional magnetic field at some point during sweep 39. If the resonance is to occur at $H_0=2000$ gauss, and it is desired to measure proton resonance where $\gamma=2.67\times10^4$, then from the foregoing relation $f=8.5$ mc./s.

A typical absorption curve during sweeps 39 and 40 is shown in FIG. 2B. It can be seen that as sweep 39 increases from 1999 gauss towards 2000 gauss, the absorption in the sample increases and reaches its maximum at 2000 gauss. Thereafter the absorption decreases as sweep 39 continues on to 2001 gauss. Similarly as sweep 40, decreasing from 2001 gauss, passes through 2000 gauss, the maximum absorption occurs. Since only the variations resulting from the modulation 41 are detected in phase sensitive detector 32 and recorded on recorder 34, actually the derivative of the absorption curve shown in FIG. 2B is measured, as shown in FIG. 2C.

For a more extensive treatment of magnetic resonance absorption phenomena, reference may be had to the literature, as for example to an article by Bloembergen, Purcell and Pound entitled "Relaxation Effects in Nuclear Magnetic Resonance Absorption," Physical Review, vol. 73, pages 679–712 (1948), or to an article entitled "Fundamentals of Nuclear Magnetic Resonance Absorption," Nos. I and II, by G. E. Pake, American Journal of Physics, vol. 18, pages 438–452, and pages 473–486 (1950).

In FIGS. 3 and 3A are shown two views in detail of the sample testing portion of the apparatus of FIG. 1, designated by the numeral 10 therein. In FIG. 3, magnet 14 is shown supported in a housing 43. Between the pole faces 12 and 13 is a non-conductive, non-magnetic plastic support 44 which contains the modulation coils, the R.F. coil and the sample receiving chamber, as shown in greater detail in connection with FIG. 3A. Wound around magnet 14 but with insulation 45 therebetween are sweep coils 16 comprising separate coils 16A and 16B.

Magnet 14 is divided into a north pole section 14A and a south pole section 14B such that the unidirectional field is supplied between pole faces 12 and 13 through sample support 44, the return magnetic path being provided by back-up plate 52A, base plate 53, and back-up plate 52B, as shown by the dashed line 54. The forward part of magnet section 14A is tapered in portion 55A but cylindrical in portion 56A at pole face 12. Similarly section 14B is tapered in portion 55B but cylindrical in portion 56B at pole face 13. Cylindrical portions 56A and 56B are suspended respectively by non-magnetic yokes 57A and 57B, secured to sides 58 and 59 of housing 43 (FIG. 3A).

As shown in FIG. 3A, support 44 consists of a block of plastic material through which a hole 46 has been bored from top to bottom. Hole 46 is adapted to receive the sample to be tested, which may be in the form of an isolated sample placed in channel 46 or in the form of a continuous stream of material passing therethrough. Modulation coils 15A and 15B are molded in plastic housing 44 such that their longitudinal axis is parallel to the unidirectional magnetic field and bisects channel 46. Capacitors 47 and 48 are connected between coils 15A and 15B and ground. R.F. coil 11 is wound around channel 46 and molded into plastic housing 44. Channels 49 and 50 provide conduits through which the conductors to coils 15 and 11, respectively, may be passed. Capacitors 47 and 48 are for the purpose of R.F. decoupling of coil sections 15A and 15B respectively. When a sample is to be inserted in a test tube and thence into channel 46, a stopper 51 at the lower end of channel 46 may be provided.

Figure 4:
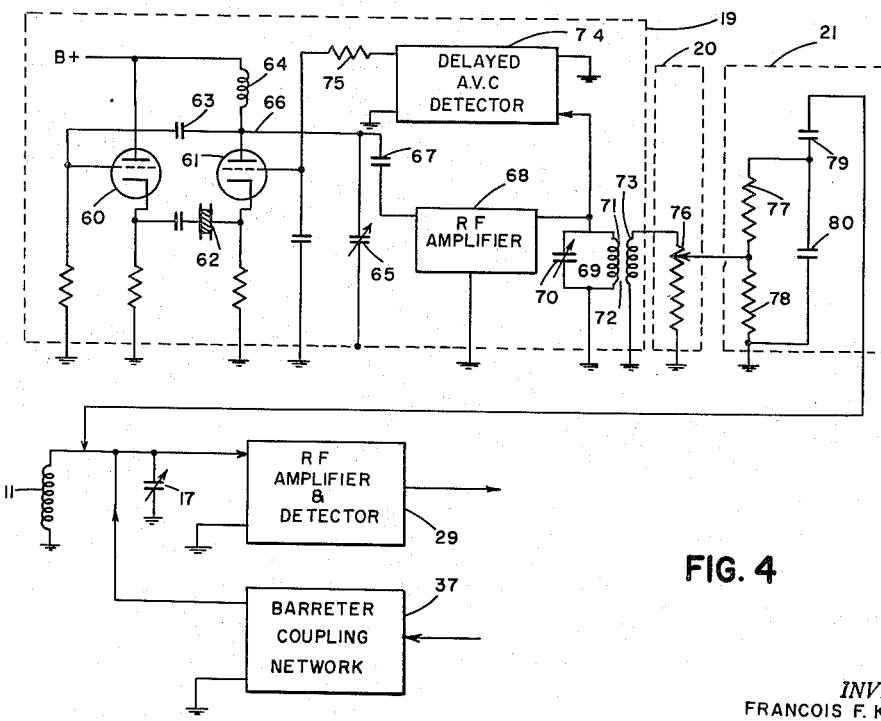
FIG. 4 is a circuit diagram of the essentially noise-free high frequency oscillator and the circuit for coupling said oscillator to the coil circuit.

In FIG. 4 there is shown in greater detail generating circuit 18 for coupling to R.F. coil 11 a substantially noise-free R.F. current of the proper constant frequency and of constant intensity. Oscillator 19 includes an oscillating circuit comprising twin triodes 60 and 61 which are cathode-coupled through a crystal 62 which is resonant at the R.F. frequency desired to be applied to detecting coil 11. The output of tube 61 provides positive feedback through capacitor 63 to the grid of tube 60. Tank coil 64 and tank capacitor 65 are tuned to the resonant frequency of crystal 62. The output 66 of the oscillator circuit is applied through coupling capacitor 67 to a radio frequency amplifier 68 having a tuned circuit 69 in the output thereof, also tuned to the frequency of crystal 62. Tuned circuit 69 may comprise a tuning capacitor 70 and the primary 71 of an R.F. transformer 72. The output of oscillator 19 is obtained across the secondary 73 of R.F. transformer 72.

In order that the output of oscillator 19 may be substantially noise-free in the low frequency range of interest and will be substantially constant in intensity, the output of amplifier 68 is applied to a delayed AVC detector 74. The D.C. output of detector 74 is applied through decoupling resistor 75 to the grid of triode 61. By this arrangement the intensity of the R.F. signal output of oscillator 19 will be maintained constant. In addition, detector 74 acts as a low pass filter having a cut-off frequency at about 10 kc. This circuit thus provides a negative feedback between the output of R.F. amplifier 68 and the grid of tube 61, and assures that the output of oscillator 19 is essentially free of noise up to 10 kc. Since the detecting circuit shown in FIG. 1 will, in general, respond only to low frequency variations, the elimination of noise up to 10 kc. provides substantially noise-free operation.

The output of oscillator 19 is applied to an attenuator 20, which is shown in FIG. 4 as merely comprising a potentiometer 76. Preferably, however, attenuator 20 comprises a resistor network with calibrated switches, such as the type described on page 315 of "Vacuum Tube Amplifiers," Valley and Wallman, McGraw-Hill, New York (1948).

The output of attenuator 20 is applied in coupling network 21 to a termination consisting essentially of resistors 77 and 78. The current flowing in resistor 77 also flows into capacitors 79 and 80. Capacitors 79 and 80 comprise an impedance transformer across R.F. coil 11 and its associated capacitors. The impedance reflected from the tank circuit including coil 11 to the junction of capacitors 79 and 80 is essentially resistive and its value is directly proportional to the impedance of the tank circuit. This reflected resistance is also small in relation to the value of resistor 77, so the current through resistor 77 is constant. Since the current also flows through the resistance reflected at the junction of capacitors 79 and 80, and since the voltage across the tank circuit is a fixed ratio of the voltage at the junction of capacitors 79 and 80, the voltage across coil 11 is dependent mainly upon the resistance of the coil. To this end, the resistance of resistance 77 may be in the order of 200 times greater than the resistance reflected at the junction of capacitors 79 and 80. In addition, the capacitance of capacitor 80 may be on the order of 100 times the capacitance of capacitor 79. Coupling circuit 21 has the advantage that the introduction of the signal to coil 11 imposes substantially no loading on this coil.

Applicants' novel absorption spectrometer may be used, for example, to determine moisture content in starch. For moisture content in starch between 5 and 15%, the peak to peak amplitude of the derivative curves shown in FIG. 2C will be a function of the moisture. A starch sample may be placed in a test tube and inserted in a sample coil 11 (FIG. 3) or the starch samples may flow freely through this coil for continuous moisture measurements.

When the intensity of magnet 13 is proper, the two derivative curves shown in FIG. 2C will be symmetrical. If these curves are not symmetrical, current bias control 25 may be adjusted until symmetry is reached. At this time the intensity of the magnetic field is proper in relation to the frequency of oscillator 19, the particular sample under investigation, and the sweep intensity.

While only one representative embodiment has been described, it will be understood that the invention is subject to considerable modifications by those skilled in the art within the scope of the appended claims.

We claim:

1. A magnetic resonance absorption spectrometer comprising means for generating a unidirectional magnetic field, a sample receiving coil having its axis disposed perpendicularly to said magnetic field, means for sweeping said magnetic field slowly between predetermined limits, means for applying a substantially constant frequency, constant amplitude alternating current to said sample receiving coil, said constant frequency being selected substantially equal to the resonance precession frequency of particular paramagnetic particles in said sample at at least one intensity of said magnetic field during said sweep, said current applying means including a current regulating resistor and impedance transforming means for coupling said resistor in series with said coil, a tuning capacitor coupled across said coil for making a tank circuit therewith tuned to said constant frequency, means for amplifying signals of said constant frequency across said tank circuit, means coupled to said amplifying means for detecting any amplitude variations of said signals, negative feedback means coupling the output of said detecting means with the input of said amplifying means for maintaining the signal across said tank circuit substantially constant, and means for recording said detected amplitude variations as a function of time.

2. A magnetic resonance absorption spectrometer comprising means for generating a unidirectional magnetic field, a sample receiving coil having its axis disposed perpendicularly to said magnetic field, means for sweeping said magnetic field slowly between predetermined limits, means for modulating said magnetic field at a low frequency between predetermined lower limits, means for applying a substantially constant frequency, constant amplitude, essentially noise-free alternating current to said sample receiving coil, said constant frequency being selected substantially equal to the resonance precession frequency of particular paramagnetic particles in said sample at at least one intensity of said magnetic field during said sweep, said current applying means including a current regulating resistor and impedance transforming means for coupling said resistor in series with said coil, a tuning capacitor coupled across said coil for making a tank circuit therewith tuned to said constant frequency, means for amplifying signals of said constant frequency across said tank circuit, means coupled to said amplifying means for detecting any modulation of said signals at said low frequency, negative feedback means coupling the output of said detecting means with the input of said amplifying means for maintaining the signal across said tank circuit substantially constant, and means for recording variations in said detected modulation as a function of time.

3. A magnetic resonance absorption spectrometer comprising means for generating a unidirectional magnetic field, a sample receiving coil having its axis disposed perpendicularly to said magnetic field, means for sweeping said magnetic field slowly between predetermined limits, means for modulating said magnetic field at a low frequency between predetermined lower limits, oscillator means for generating a substantially constant frequency alternating current, said constant frequency being selected substantially equal to the resonance precession frequency of particular paramagnetic particles in said sample at at least one intensity of said magnetic field during said sweep, first amplifying means for amplifying the output of said oscillator means, high-valued resistance means for maintaining the current intensity of the output of said first amplifying means substantially constant, capacitive impedance transforming means for applying the substantially constant output of said first amplifying means to said coil, a tuning capacitor coupled across said coil for making a tank circuit therewith tuned to said constant frequency, second amplifying means for amplifying signals of said constant frequency across said tank circuit, means coupled to said second amplifying means for detecting any modulation of said signals at said low frequency, negative feedback means coupling the output of said detecting means with the input of said second amplifying means for maintaining the signal across said tank circuit substantially constant, and means for recording variations in said detected modulation as a function of time.

4. A magnetic resonance absorption spectrometer comprising means for generating a unidirectional magnetic field, a sample receiving coil having its axis disposed perpendicularly to said magnetic field, means for sweeping said magnetic field slowly between predetermined limits, means for modulating said magnetic field at a low frequency between predetermined lower limits, crystal controlled oscillator means for generating a substantially constant frequency alternating current, said constant frequency being selected substantially equal to the resonance precession frequency of particular paramagnetic particles in said sample at at least one intensity of said magnetic field during said sweep, first amplifying means for amplifying the output of said oscillator means, delayed automatic volume control means coupling the output of said first amplifying means with said oscillator means, said volume control means being arranged to provide negative feedback in a predetermined band of frequencies whereby the output of said first amplifying means is substantially noise-free in said band, means including a current regulating resistor and impedance transforming capacitors for applying the output of said first amplifying means to said coil, a tuning capacitor coupled across said coil for making a tank circuit therewith tuned to said constant frequency, second amplifying means for amplifying signals of said constant frequency across said tank circuit, means coupled to said second amplifying means for detecting any modulation of said signals at said low frequency, second negative feedback means coupling the output of said detecting means with the input of said second amplifying means for maintaining the signal across said tank circuit substantially constant, and means for recording variations in said detected modulation as a function of time.

5. A magnetic resonance absorption spectrometer comprising means for generating a unidirectional magnetic field, a sample receiving coil having its axis disposed perpendicularly to said magnetic field, means for sweeping said magnetic field slowly between predetermined limits, means for modulating said magnetic field at a low frequency between predetermined lower limits, means for applying a substantially constant frequency, constant amplitude, essentially noise-free alternating current to said sample receiving coil, said constant frequency being selected substantially equal to the resonance precession frequency of particular paramagnetic particles in said sample at at least one intensity of said magnetic field during said sweep, said current applying means including a current regulating resistor and impedance transforming means for coupling said resistor in series with said coil, a tuning capacitor coupled across said coil for making a tank circuit therewith tuned to said constant frequency, first amplifying means for amplifying signals of said constant frequency across said tank circuit, means coupled to said first amplifying means for detecting any modulation of said signals at said low frequency, second amplifying means for amplifying said detected modulation, negative feedback means coupling the output of said second amplifying means with the input of said first amplifying means for maintaining the signal across said tank circuit substantially constant, third amplifying means coupled to the output of said second amplifying means for further amplifying said detected modulation, and phase sensitive detector means coupled to said third amplifying means and to said modulating means for providing a direct current output proportional to the variations in said detected modulation, and means for recording said variations as a function of time.

6. A magnetic resonance absorption spectrometer comprising a permanent magnet providing a unidirectional magnetic field between the pole faces thereof, first coil means wound on said magnet for sweeping said magnetic field slowly between predetermined limits, a non-conductive, non-magnetic plastic housing adapted to be mounted between said pole faces, a channel extending through said housing perpendicularly to said magnetic field and adapted to receive a sample, second coil means wound coaxially about said channel, said housing defining a space about said channel in the vicinity of said second coil means, third coil means for modulating said magnetic field at a low frequency between predetermined lower limits molded in said housing with its axis parallel to said magnetic field, means for applying a substantially constant frequency, constant intensity, noise-free alternating current to said second coil means, said constant frequency being selected substantially equal to the resonance precession frequency of particular paramagnetic particles in said sample at at least one intensity of said magnetic field during said sweep, a tuning capacitor coupled across said second coil means for making a tank circuit therewith tuned to said constant frequency, means for amplifying signals of said constant frequency across said tank circuit, means coupled to said amplifying means for detecting any modulation of said signals at said low frequency, negative feedback means coupling the output of said detecting means with the input of said amplifying means for maintaining the signal across said tank circuit substantially constant, and means for recording variations in said detected modulation as a function of time.

References Cited in the file of this patent

UNITED STATES PATENTS

| | | |
|---|---|---|
| 2,444,349 | Harrison | June 29, 1948 |
| 2,589,494 | Hershberger | Mar. 18, 1952 |
| 2,756,383 | Nold et al. | July 24, 1956 |

FOREIGN PATENTS

| | | |
|---|---|---|
| 664,644 | Great Britain | Jan. 9, 1952 |

OTHER REFERENCES

Andrew: Nuclear Magnetic Resonance, published 1955 by Cambridge University Press (pp. 35–40 relied on).

Bloembergen et al.: Physical Review, vol. 73, No. 7, Apr. 1, 1948, pp. 679–712.

Shaw et al.: Journal of Association of Official Agricultural Chemists, vol. 36, No. 4, pp. 1070–1076, Nov. 15, 1953.

Ingram: Spectroscopy at Radio and Microwave Frequencies, Butterworths Scientific Publications, London, 1955, pp. 35–37.

Andrew: Nuclear Magnetic Resonance, published 1955 by Cambridge University Press (pp. 43–47).

Wertz: Chemical Reviews, vol. 55, No. 5, October 1955, pp. 890–891 relied on.

Packard—The Review of Scientific Instruments, vol. 19, No. 7, July 1948, pp. 435–439.